US008879358B2

(12) United States Patent
Niemann (10) Patent No.: US 8,879,358 B2
(45) Date of Patent: Nov. 4, 2014

(54) DEVICE FOR DETERMINING A FILLING LEVEL

(75) Inventor: Thomas Niemann, Delmenhorst (DE)

(73) Assignee: Hella KGaA Hueck & Co., Lippstadt (DE)

( * ) Notice: Subject to any disclaimer, the term of this patent is extended or adjusted under 35 U.S.C. 154(b) by 534 days.

(21) Appl. No.: 13/065,151

(22) Filed: Mar. 15, 2011

(65) Prior Publication Data

US 2011/0228641 A1    Sep. 22, 2011

(30) Foreign Application Priority Data

Mar. 16, 2010 (DE) .......................... 10 2010 011 492

(51) Int. Cl.
G01S 15/00 (2006.01)
G01F 23/296 (2006.01)
G01S 15/88 (2006.01)

(52) U.S. Cl.
CPC ............. *G01F 23/2962* (2013.01); *G01S 15/88* (2013.01)
USPC .......................................................... 367/99

(58) Field of Classification Search
USPC .......................................................... 367/99
See application file for complete search history.

(56) References Cited

U.S. PATENT DOCUMENTS

| 3,864,609 | A | | 2/1975 | Di Giacomo | |
| 5,315,563 | A | * | 5/1994 | Lichtenfels et al. | 367/99 |
| 5,568,449 | A | * | 10/1996 | Rountree et al. | 367/99 |
| 5,856,953 | A | * | 1/1999 | Durkee | 367/99 |
| 2004/0179429 | A1 | * | 9/2004 | Preston | 367/99 |
| 2006/0201578 | A1 | | 9/2006 | Schillinger et al. | |
| 2008/0302439 | A1 | * | 12/2008 | Spanke et al. | 141/1 |
| 2009/0301187 | A1 | | 12/2009 | Beyer et al. | |
| 2010/0097892 | A1 | * | 4/2010 | Aughton et al. | 367/99 |
| 2010/0251816 | A1 | * | 10/2010 | Bahorich et al. | 73/304 C |

FOREIGN PATENT DOCUMENTS

| DE | 41 29 401 | 3/1993 |
| DE | 10 2007 014 540 | 10/2008 |
| DE | 10 2008 027 969 | 12/2009 |
| EP | 2 133 670 | 12/2009 |
| WO | WO 2008/009277 | 1/2008 |
| WO | WO 2008009277 A1 * | 1/2008 |

OTHER PUBLICATIONS

European Office Action dated Jun. 21, 2011 and European Search Report dated Jun. 9, 2011 in European Application No. 11157857.1 with English translation of the relevant parts.
English translation of German Search Report dated Dec. 22, 2010 in German Application No. 10 2010 011 492.8.
English translation of German Search Report dated Dec. 1, 2010 in German Application No. 10 2010 011 490.1.
European Search Report dated Aug. 9, 2011 in European Application No. 11 15 6554 with English translation of relevant portion of same.

* cited by examiner

*Primary Examiner* — Isam Alsomiri
*Assistant Examiner* — James Hulka
(74) *Attorney, Agent, or Firm* — Collard & Roe, P.C.

(57) ABSTRACT

A device for determining a filling level in a container, with a stillwell which has an entry opening and a vent opening, an ultrasonic transducer arranged in the base region of the stillwell and at least one pre-chamber. The pre-chamber has an inlet opening to the container and an outlet opening to the entry opening of the Stillwell. The pre-chamber of the device has a second outlet opening that opens out in a lead-off arrangement. By the lead-off arrangement, foamed medium flowing in quickly and suddenly into the pre-chamber of the device does not arrive into the measurement section of the ultrasonic transducer.

18 Claims, 11 Drawing Sheets

DEVICE FOR DETERMINING A FILLING LEVEL

CROSS REFERENCE TO RELATED APPLICATIONS

Applicant claims priority under 35 U.S.C. §119 of German Application No. 10 2010 011 492.8 filed Mar. 16, 2010, the disclosure of which is incorporated by reference.

BACKGROUND OF THE INVENTION

The invention concerns a device for determining a filling level in a container, with a stillwell which has an entry opening and a vent opening, with an ultrasonic transducer arranged in the stillwell and with at least one pre-chamber. The pre-chamber has an inlet opening to the container and an outlet opening to the entry opening of the stillwell.

In order to determine the oil level in engines, ultrasonic sensors are predominantly used. These emit sound waves which can be measured at the interface between two media, e.g. gas and oil, wherein other fluids can also be measured instead of oil, reflected and received again by the ultrasonic sensor. From the detected run time of the sound waves, the filling level can then be determined in the container which has the device. In an engine which is in operation, in particular in a motor vehicle, the filling level of the oil is, however, only difficult to determine or even unable to be determined at all, because the oil is highly foamed and the sound waves are reflected on the small gas bubbles in the oil. The detected values are therefore very intensively dispersed and indicate an oil level which is too low.

For measurements which are able to be evaluated, however, a clear interface is necessary between the media of gas and oil. In order to counteract the problem of intensively dispersive values, damping arrangements, e.g. so-called stillwells, are associated with the ultrasonic sensors. Inside these stillwells, which surround the measurement section of the ultrasonic sensor, the fluid which is to be measured is calmed, and is only connected with the container through a small opening of the stillwell to the container. Through the small opening of the stillwell to the container, fewer gas bubbles arrive into the stillwell. The filling level in the stillwell corresponds here to the fluid level outside the stillwell.

Further developments of such a stillwell are shown by European Patent Application No. EP 2 133 670 A1, German Patent Application No. DE 10 2008 027 969 A1, and PCT Application Publication No. WO 2008/009277 A1. In these publications, a pre-volume chamber is associated with the stillwell. These pre-volume chambers serve to degas the fluid which is to be measured, e.g. foamed oil, so that a fluid which is relative free of bubbles flows in the measurement section of the stillwell.

However, tests show that the foamed oil flows through the known pre-volume chambers and chambers very quickly in an engine in the case of sudden jumps in rotation speed, e.g. from 3000 to 4000 or 5000 revolutions/minute, without there being a possibility for the foamed oil to degas in the pre-volume chamber. It therefore occurs that small gas bubbles are brought into the measurement section of the stillwell and impede the correct indication of the filling level. As these small gas bubbles can only escape slowly from the measurement section of the stillwell, the known sensors also do not detect the actual filling level in the container for a long time after the jumps in rotation speed, although a measurable filling level is present outside the stillwell.

The time in which the filling level is not correctly detected is designated as the dead time and potentially leads to the fault indication of a filling level which is too low in the container. This problem occurs in particular in the case of a dynamic driving mode over a lengthy period of time, because here, owing to the long dead times in which the actual filling level is not determined, a mean value calculation is no longer possible, which can consequently lead to greater damage through "incorrect action" due to the false fault indication.

SUMMARY OF THE INVENTION

It is therefore an object of the invention to provide a device of the type named above, in which a stable detection of the filling level in the container is also possible without lengthy dead times in the case of a dynamic driving mode with jumps in rotation speed.

The solution to this problem occurs with a device for determining a filling level in a container, with a stillwell which has an entry opening and a vent opening, with an ultrasonic transducer arranged in the stillwell and at least one pre-chamber. The pre-chamber has an inlet opening to the container and an outlet opening to the entry opening of the Stillwell. The pre-chamber of the device has a second outlet opening that opens out in a lead-off arrangement that ends in the upper end region of the measurement section of the stillwell. In the case of high rotation speeds and with sudden changes in rotation speed, highly foamed fluid flows into the pre-chamber of the device and can be guided via the second outlet opening into the lead-off arrangement. The fact that foamed fluid which is flowing in is pressed into the lead-off arrangement and not further into the pre-chamber is due to the greater inertia of the fluid in the pre-chamber. Only a small partial flow of the foamed fluid arrives into the pre-chamber and is decelerated there such that the small gas bubbles which are contained can degas, and a stable, detectable filling level is present in the measurement section of the Stillwell. Even in the case of sudden changes in rotation speed, the filling level corresponds to the filling level in the container. It is important here that the partial flow which arrives into the pre-chamber is only a small portion of the entire volume flowing into the device. In the case of greater volume flows suddenly rushing in, gas bubbles would arrive into the measurement section. The determined values would then be impaired over a lengthy period of time.

After the fluid has calmed down in the container, the majority of the volume in the lead-off arrangement flows via the inlet opening of the pre-chamber back into the container again, without gas bubbles arriving into the pre-chamber or the measurement section of the device. In the case of moderate changes to the filling level and lower rotation speeds, the pre-chamber acts to disperse the gas bubbles, and in the measurement section of the ultrasonic sensor in the stillwell a bubble-free measurement can take place. A lead-off pipe, bypass, shaft or duct is a possible embodiment as the lead-off device.

So that the partial flow penetrating into the pre-chamber, despite a second outlet opening and lead-off arrangement, is decelerated effectively, the second outlet opening of the pre-chamber is arranged in the direction of flow directly behind the inlet opening of the pre-chamber to the container and before the windings of the pre-chamber. Through this arrangement, security exists to a maximum extent. The section between the second outlet opening to the lead-off arrangement and the entry opening into the stillwell is therefore as long as possible. Any other arrangement of the second outlet opening would shorten the distance which the foamed oil, which is not diverted into the lead-off arrangement, must cover in the pre-chamber, and would therefore increase the possibility of the entry of gas bubbles into the measurement section of the stillwell.

Furthermore, the outlet opening with the lead-off arrangement is arranged in the upper region of the pre-chamber. It is thereby achieved that in the fluid, flowing quickly into the pre-chamber and intensively interspersed with air bubbles, does not arrive into the pre-chamber, but rather is deflected upwards in a simple manner. This is promoted in that the foamed fluid has a lower density than the non- or less foamed fluid in the pre-chamber. In addition, the gas bubbles in the fluid strive to escape upwards. If the lead-off arrangement from the pre-chamber is directed downwards, for example, the small gas bubbles which were directed off with the foamed fluid would rise upwards and would arrive into the pre-chamber again. Therefore, the lead-off arrangement is preferably aligned upwards, i.e. perpendicular to the horizontal and preferably has a vent opening in the upper end region.

The upwardly aligned lead-off arrangement, constructed for example as a lead-off pipe, bypass, shaft or duct, is advantageously arranged parallel to the measurement section of the ultrasonic transducer in the stillwell. It is thereby achieved that both the measurement section and also the lead-off arrangement undergo the same mechanical deflection in the case of vibrations of the stillwell. This is important, because through the vibration of the stillwell at particular rotation speeds or in particular rotation speed ranges, a suction can occur in the interior of the stillwell. The inflowing, foamed fluid then arrives more easily into the device and could flow through the pre-chamber into the measurement section without degassing. Due to the identical suction in the lead-off arrangement and the opposed resistance in the pre-chamber, the fluid is now deflected into the lead-off arrangement despite the suction in the measurement section. As the measurement section of the ultrasonic transducer is aligned so that the sound waves are emitted perpendicularly upwards from the ultrasonic sensor arranged on the bottom of the stillwell, the oil foam or the fluid are conveyed off upwards in the lead-off arrangement.

In another embodiment, the lead-off arrangement is guided lying externally against the stillwell. In combination with the parallel alignment to the measurement section of the ultrasonic transducer in the stillwell, a simple and space-saving construction of the lead-off arrangement is thus realized.

According to the invention, the lead-off arrangement ends in the upper end region of the measurement section of the stillwell. The lead-off arrangement preferably terminates at the upper end precisely adjacent to the measurement section. Thus, the suction possibly occurring on stimulation of the stillwell in the measurement section and in the lead-off arrangement is approximately identical. In addition, it is to be prevented that fluids, such as foamed oil, run into the lead-off arrangement via the upper opening of the lead-off arrangement. In order to additionally impede the running in of foamed oil via the upper vent opening of the lead-off arrangement, a shielding element is associated with the lead-off arrangement in the upper end region. This shielding element is preferably constructed so that air can escape from the lead-off arrangement, but an entry of fluid or oil foam is not possible. In a possible embodiment, the vent openings of the lead-off arrangement and of the shielding element are arranged so as to be staggered with respect to each other. In one embodiment, the shielding element can span the lead-off arrangement and the measurement section of the stillwell, thus therefore the entire device, so that the ultrasonic sensor according to the invention has a shared shielding element instead of individual shielding elements for the upper vent openings.

According to another embodiment, the pre-chamber is improved compared with the prior art. The pre-chamber has at least two levels lying horizontally one over another, and the levels are flowed through in opposite directions to each other. In particular, the change in flow direction caused by the levels which are flowed through in opposite directions to each other leads to the result that even highly foamed fluids and oil foam in the case of sudden turbulences, e.g. by changes to rotation speed in the pre-chamber are decelerated so intensively that a degassing is possible. The individual levels are preferably able to be flowed through by the fluid from top to bottom and then enter into the measurement section of the stillwell.

Through the construction of two levels inside the pre-chamber, the section is lengthened which is to be flowed through and is constructed in each of the levels as a duct. Further obstacles which additionally lengthen the section and intensify the resistance with respect to the inflowing foamed fluid are provided by deflection elements which can be thickened in a rounded manner at their free ends. The flow direction in the levels of the pre-chamber is predetermined by the deflection elements. Possible embodiments are, for example, meanders or spirals, with a meander being able to be formed by several deflection elements projecting into the pre-chamber and the spiral chamber being formed by a continuous lead element. Other embodiments for pre-chamber structures with one or more levels are barriers with V-shaped deflection elements or domes, which must be flowed around by the fluid. In the description of the figures, a selection of possible pre-chamber structures is demonstrated.

The invention further concerns an engine, in particular a motor vehicle engine or a motor vehicle, which are distinguished respectively in that they have a device like the one described above.

BRIEF DESCRIPTION OF THE DRAWINGS

The invention is explained in further detail below with the aid of a preferred example embodiment illustrated in the drawings. In detail, the figures show in.

DETAILED DESCRIPTION OF THE EMBODIMENTS

Figure 1:
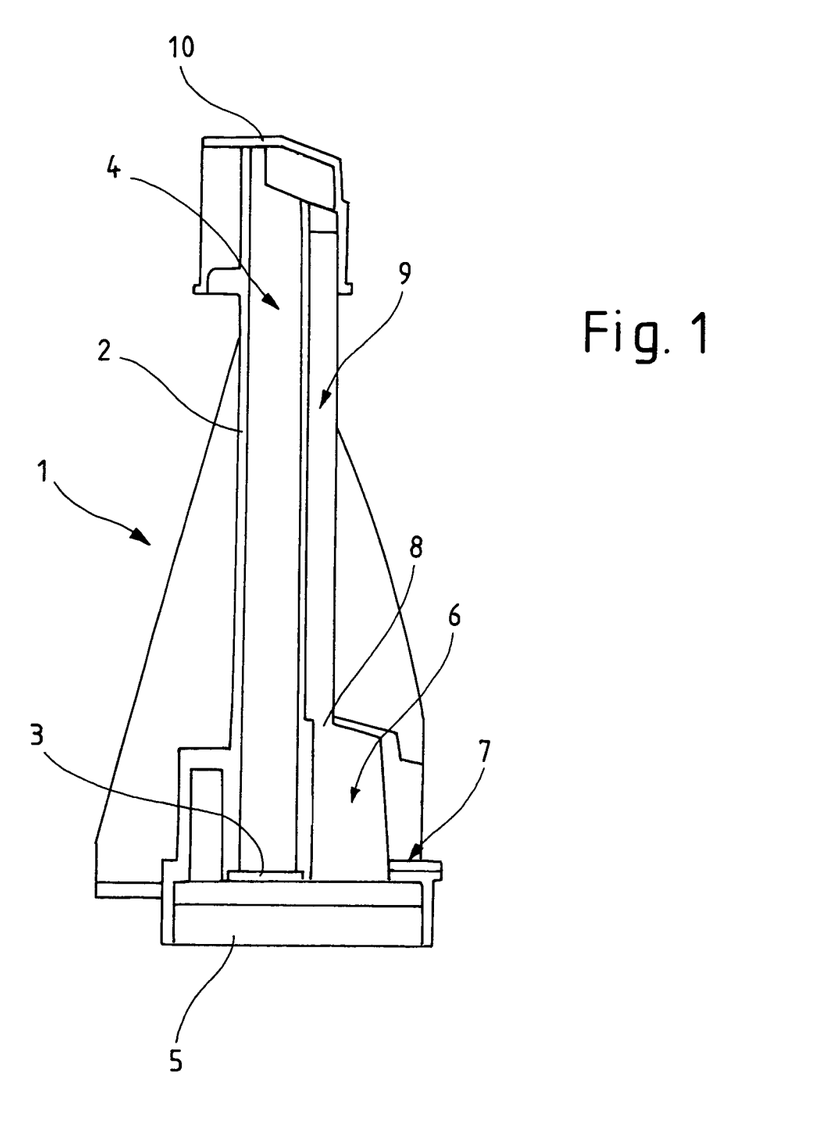
FIG. 1 shows a device according to the invention for determining a filling level, illustrated in section.

A device 1 according to the invention for determining the filling level in a container has in the base region an ultrasonic sensor 3. This ultrasonic sensor 3 is arranged on a base element 5 of device 1. A stillwell 2 is arranged centrally over ultrasonic sensor 3, with the stillwell 2 having a measurement section 4 in the interior. With a filled container, this measurement section 4 is occupied by fluid, in particular oil in an oil sump of a motor vehicle, depending on the filling level of the container. Ultrasonic sensor 3 and measurement section 4 are arranged in a line one over the other, with ultrasonic sensor 3 sending the generated sound waves into measurement section 4 of stillwell 2. In order to obtain correct measurement values, ultrasonic sensor 3 and measurement section 4 are arranged perpendicularly to the horizontal.

A pre-chamber 6, with an inlet opening 7 to the container and with two outlet openings, of which only one outlet opening 8 is illustrated in FIG. 1, is placed onto base element 5. Outlet opening 16, which is not illustrated, is the opening which leads to entry opening 17 of measurement section 4 of stillwell 2. Like outlet opening 16, the geometric structure of pre-chamber 6 is not reproduced in the diagrammatic illustration.

At the highest point of pre-chamber 6, outlet opening 8 is arranged, to which a lead-off arrangement 9 adjoins, which is aligned parallel to measurement section 4 of stillwell 2 and is arranged lying externally against stillwell 2. In the upper end region of lead-off arrangement 9 and measurement section 4 of stillwell 2, device 1 has a shielding element 10. This shielding element 10 is constructed as a cap which covers the vent openings from measurement section 4 and shielding element 9, with an external vent arrangement being provided in shielding element 10 which makes possible a degassing of measurement section 4 and lead-off arrangement 9. With lead-off arrangement 9, the penetration of oil foam or other foamed fluids into measurement section 4 or lead-off arrangement 9 via shielding element 10 is impeded.

Figure 2:
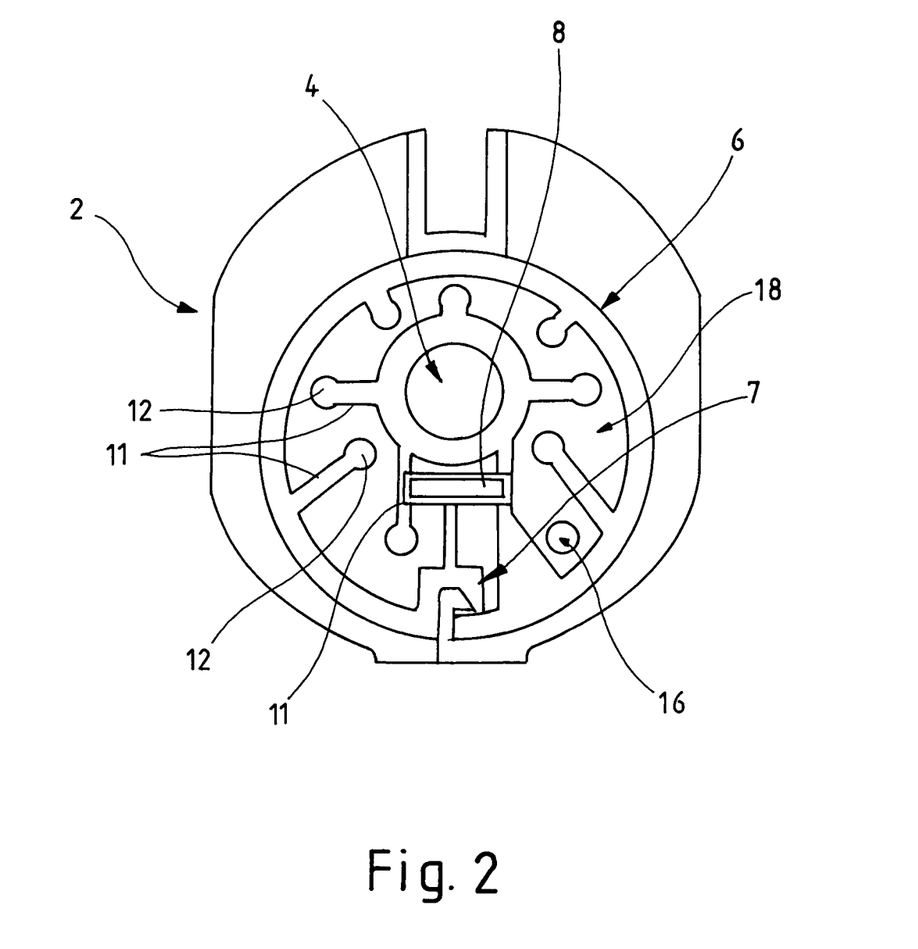
FIG. 2 shows a sectional illustration of a device according to the invention in the plane of the pre-chamber in top view.

A possible geometric structure of pre-chamber 6 and the guidance, due to this, of the inflowing fluid in pre-chamber 6, is illustrated in FIG. 2. Measurement section 4, which is surrounded by pre-chamber 6, is arranged in the middle of pre-chamber 6. Through the embodiment of pre-chamber 6, a duct 18 is formed which is guided once around measurement section 4. Duct 18 connects inlet opening 7 to the container with outlet opening 16 to the entry opening 17 of measurement section 4 of stillwell 2. Here, a plurality of deflection elements 11 form obstacles in duct 18 of pre-chamber 6.

In the embodiment shown, the built-in deflection elements 11 lead to windings around which the inflowing fluid is deflected and decelerated. The deflection elements are connected in an alternating manner with the walls of duct lying opposite. In this embodiment, the flow of the fluid in this embodiment is therefore comparable with a meander. The number of windings corresponds here to the number of deflection elements 11 installed in pre-chamber 6. The free ends of deflection elements 11 are provided in addition with rounded thickenings 12. The section which is to be flowed through by the fluid in the pre-chamber 6 is as long as possible due to the configuration of duct 18. In this embodiment, the outlet opening 8 is placed on the end of the duct 18 with the inlet opening 7, without one of the deflection elements 11 being arranged between inlet opening 7 and outlet opening 8. In addition, outlet opening 8 is embodied so as to be rectangular.

When a container is equipped with a device 1 and receives the fluid which is to be measured, in particular oil in an engine of a motor vehicle, pre-chamber 6 and measurement section 4 fill with the fluid. The filling level present in measurement section 4 corresponds here to the filling level in the container. On operation of the motor vehicle engine with a device 1 according to the invention, the fluid is foamed by the constant agitation.

The foamed oil or the fluid arrives via inlet opening 7 into pre-chamber 6 and in the case of low rotation speeds and moderate increases in rotation speed flows via the duct 18, constructed in the pre-chamber 6, to the outlet opening 16 and to the entry opening 17 of the measurement section 4 of stillwell 2.

The geometric structure of duct 18, formed by deflection elements 11, reduces the speed of flow and gas bubbles can escape out from the foamed fluid before the pre-chamber 6 is flowed through. The fluid which is thus degassed enters via outlet opening 16 and entry opening 17 into measurement section 4. The gas situated in measurement section 4 can escape via a vent arrangement in the upper end region of measurement section 4 in the case of a rising filling level and in the case of a falling filling level can penetrate again into measurement section 4. Shielding element 10 prevents oil foam or fluid from arriving into the measurement section 4, instead of gas.

In the case of sudden changes in filling level, in particular in the case of a dynamic driving mode and jumps in rotation speed, the inflowing fluid can not be sufficiently decelerated in duct 18, which is constructed in pre-chamber 6. Through the greater resistance, opposed to the inflowing fluid, and the higher inertia of the fluid in pre-chamber 6, it is ensured that the inflowing fluid does not arrive into measurement section 4. Instead of this, due to the arrangement of outlet opening 8 close to inlet opening 7 and the parallel construction, approximately at equal height, of the lead-off arrangement 9 and measurement section 4, the fluid flows into lead-off arrangement 9. By mechanical deflection or vibration of stillwell 2, in particular rotation speed ranges, in addition a suction can be produced in measurement section and the lead-off arrangement 9, which intensifies the inflowing of the fluid. An entry of gas bubbles and small gas bubbles into measurement section 4 of the ultrasonic sensor 2 is then also no longer possible with the lead-off arrangement 9 according to the invention.

Figure 3:
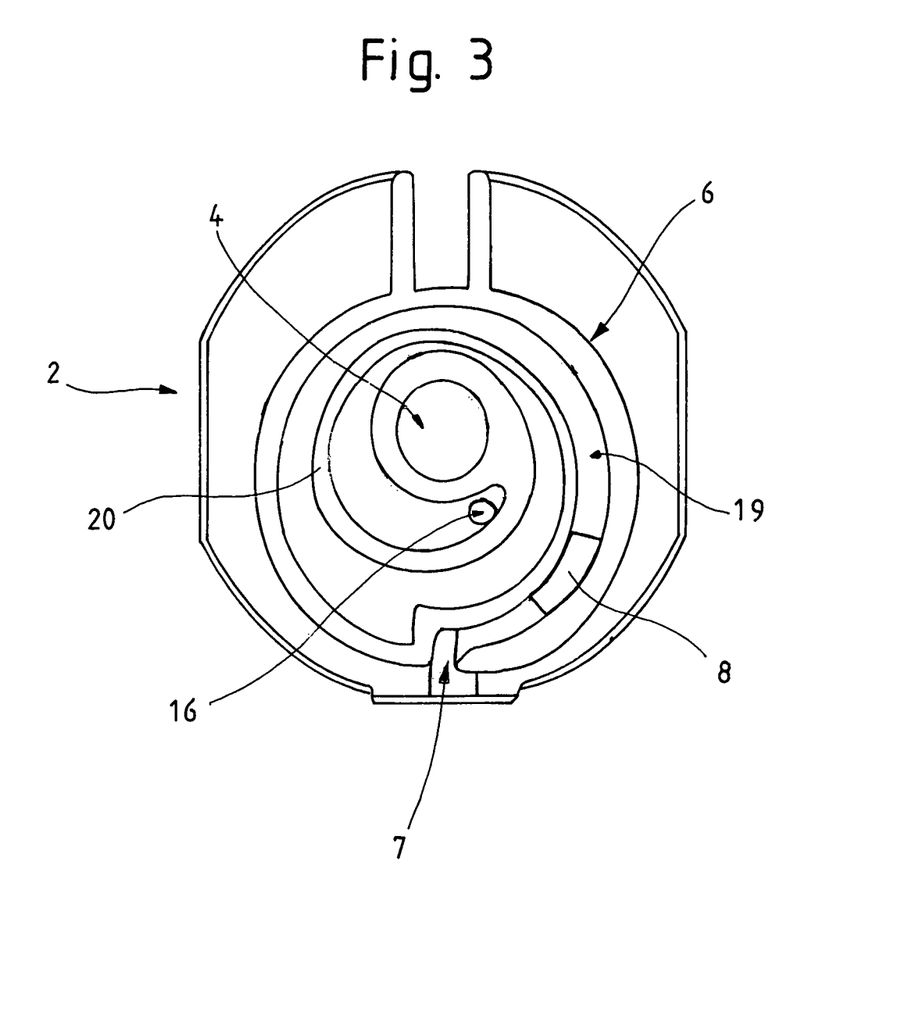
FIG. 3 shows a sectional illustration of another embodiment of a device according to the invention in the plane of the pre-chamber in top view.

FIG. 3 shows another embodiment of pre-chamber 6. Instead of arranging several deflection elements 11 in duct 19 and producing a meander structure with several windings, duct 19 is constructed in pre-chamber 6 here as a spiral and is guided twice around measurement section 4. The geometric structure of the spiral is ensured by a continuous lead element 20. The outlet opening 8 with the adjoining lead-off arrangement 9 is arranged in the outer periphery of the spiral-shaped duct 19 in the flow direction directly behind inlet opening 7.

Figure 4:
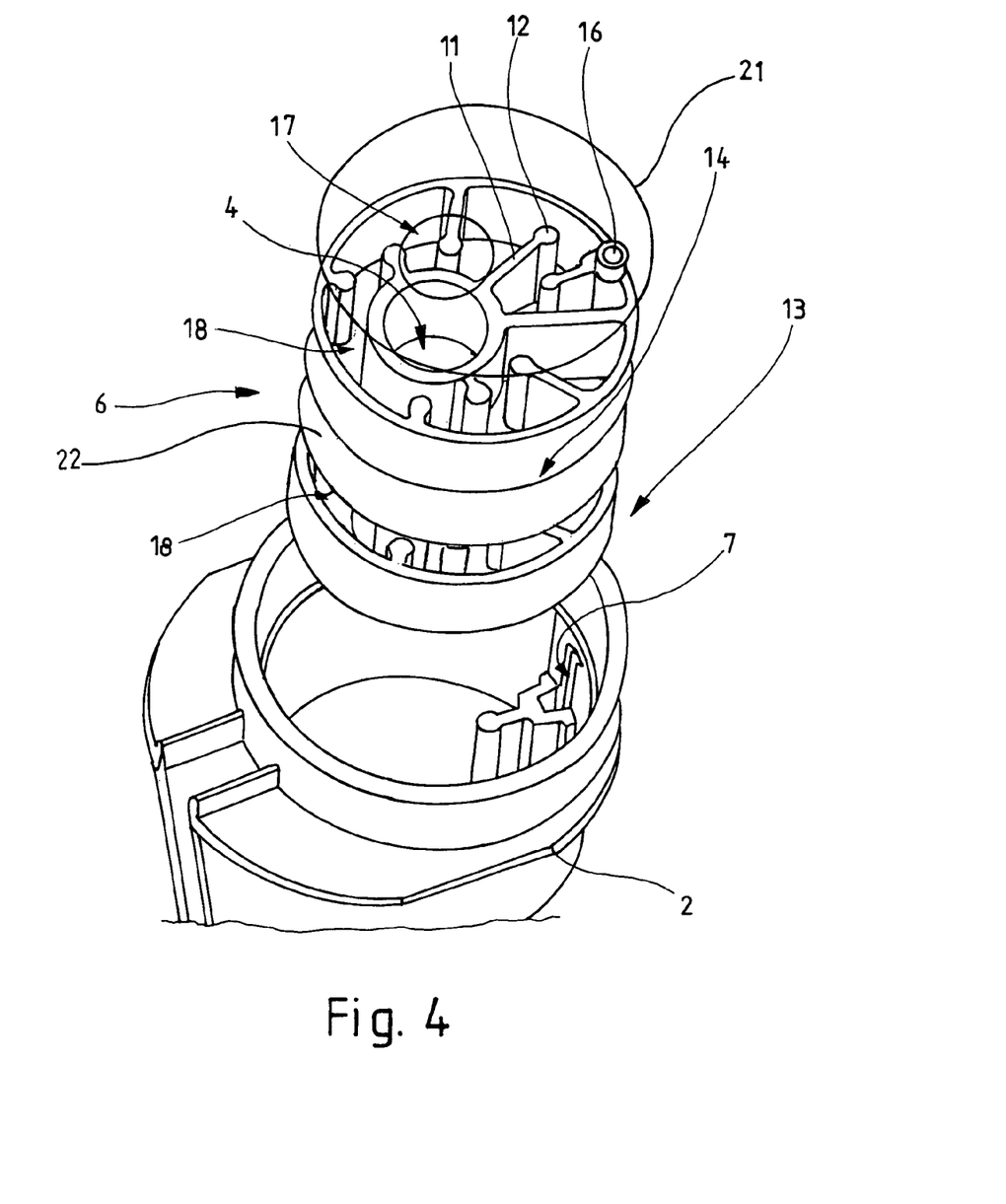
FIG. 4 shows an exploration drawing of a pre-chamber of a further embodiment, in which the pre-chamber is divided into two levels, in a perspective view.

FIG. 4 shows a further embodiment of the invention with a pre-chamber 6, which has an upper and a lower level 13, 14, with the two levels 13, 14 being flowed through in opposite directions to each other. Here, device 1 is illustrated in the drawing with the base region at the top, so that lower level 14 of the two levels is illustrated above upper level 13. The geometric structure in the two levels 13, 14 is similar here to the geometric structure of pre-chamber 6 of the first embodiment in FIG. 2. Pre-chamber 6 with two levels 13, 14 also has a duct 18 per level with deflection elements 11 and a meander structure, with rounded thickenings 12 being associated with deflection elements 11 at the free ends. Measurement section 4 of stillwell 2 is again arranged centrally and ducts 18 formed in pre-chamber levels 13, 14 are each guided once around measurement section 4 of stillwell 2. A separation element 22 with a connecting opening 15 is provided between the two levels 13, 14. This connecting opening 15 connects the last chamber of upper level 13 and the first chamber of lower level 14. Due to the selected view, the connecting opening 15 can not be seen, however, in FIG. 4. Inlet opening 7 to the container, via which the fluid which is to be measured can flow in, is arranged in upper level 13. In a base element 21, which closes lower level 14 of the pre-chamber 6, outlet opening 16 is arranged via which the fluid which has flowed in can arrive at measurement section 4.

Figure 5:
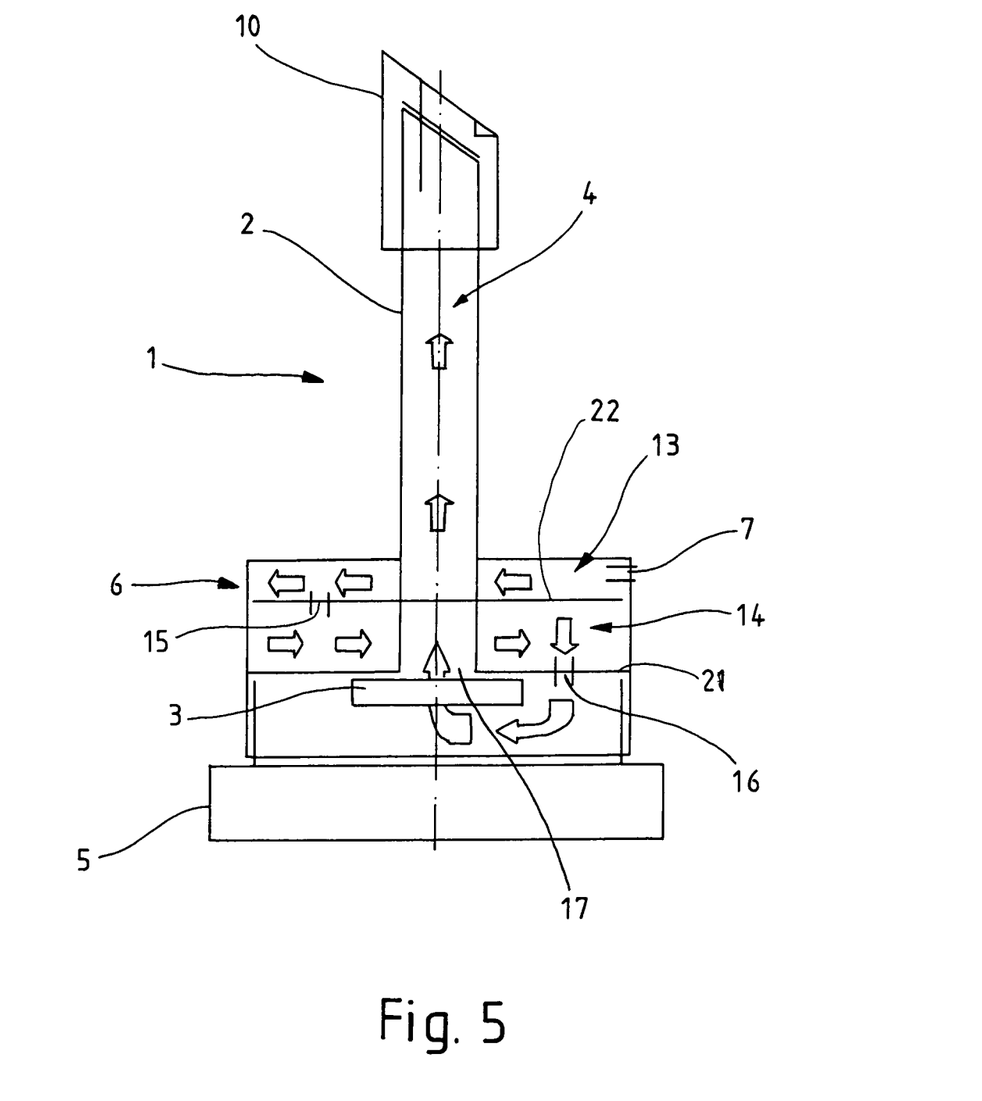
FIG. 5 shows a diagrammatic illustration of the flow direction of an embodiment with a pre-chamber divided into two levels.
Figure 6:
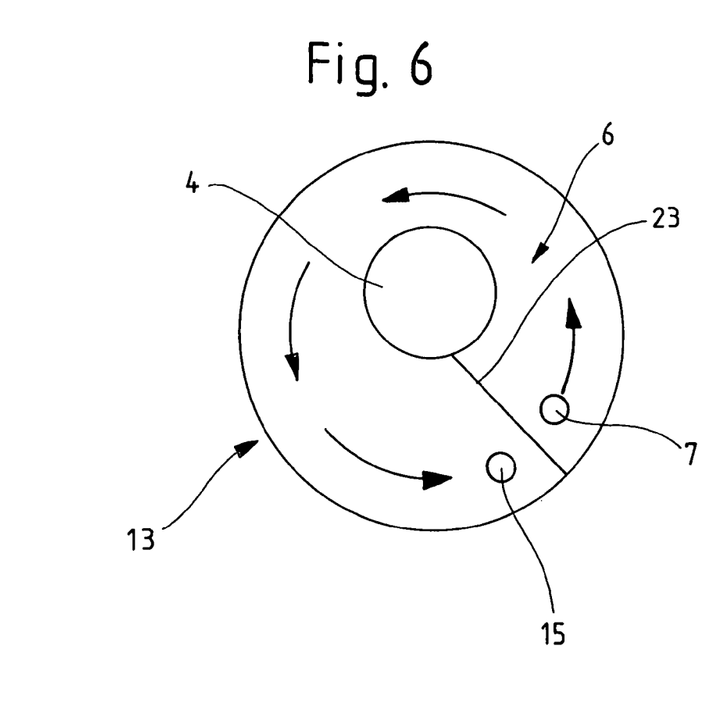
FIG. 6 shows a diagrammatic illustration of the flow direction in the upper level corresponding to FIG. 5 in top view.
Figure 7:
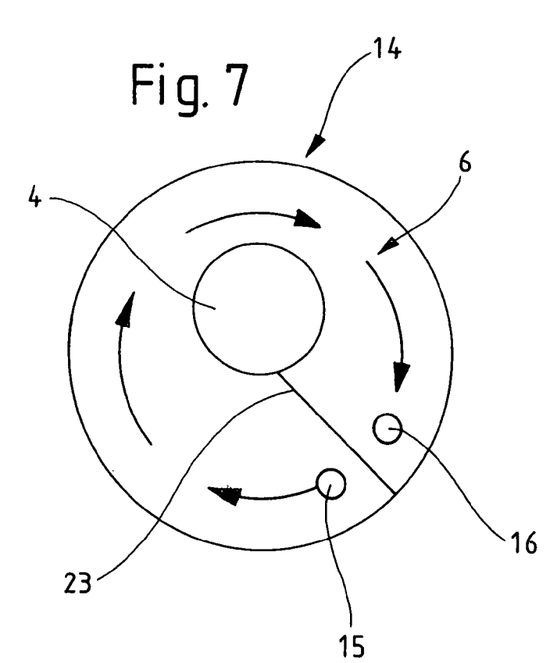
FIG. 7 shows a diagrammatic illustration of the flow direction in the lower level according to FIG. 5 in top view.

FIG. 5 to FIG. 7 show the flow direction of an inflowing fluid into stillwell 2 according to an embodiment with two pre-chamber levels 13, 14. This flows firstly via upper level 13 to connecting opening 15, via which the fluid arrives into lower level 14. By the oppositely directed flow in levels 13 and 14, the entering fluid is eddied on transition from upper level 13 to lower level 14, whereby the dispersal of gas bubbles is improved.

The flow in the individual levels is illustrated in FIG. 6 and FIG. 7, wherein FIG. 6 shows the upper level and FIG. 7 shows the lower level. The flow direction in the levels is indicated by arrows. After the fluid has flowed via inlet opening 7 into pre-chamber 6, the fluid is guided around through the geometric structure predetermined in upper level 13 once in an anti-clockwise direction around measurement section 4 of stillwell 2. Via connecting opening 15, the fluid then arrives into lower level 14 illustrated in FIG. 7. In lower level 14, the fluid flows through the predetermined geometric structure in a clockwise direction again once around measurement section 4 of stillwell 2 to outlet opening 16. It is important here that the flow direction in lower level 14, shown in FIG. 7, is oppositely directed to upper level 13 shown in FIG. 6. The geometric structure in the levels is predetermined respectively by a shut-off element 23. This shut-off element 23 is arranged respectively between the openings in the respective level and ensures that the inflowing fluid in each level is guided once around the measurement section 4.

From lower level 14, the fluid then arrives, as illustrated in FIG. 5, via outlet opening 16 in base element 21 to entry opening 17 and into measurement section 4 of stillwell 2, where the measuring of the filling level takes place with sound waves emitted by the ultrasonic sensor 3.

In the drawings, the shielding element 10 in the upper end region of the stillwell 2 and the base element 4 are also illustrated. Lead-off arrangement 9 according to the invention is not illustrated in FIG. 5 to FIG. 7.

In FIGS. 8 to 12, further embodiments of a pre-chamber 6 with two levels 13, 14 are illustrated. Here, FIG. 8 to show respectively upper level 13 and lower level 14 adjacent to each other in top view. Furthermore, inlet opening 7 in upper level 13, connecting opening 15 between upper level 13 and lower level 14, outlet opening 16 in lower level 14 and measurement section 4 can be seen in each of the FIGS. 8 to 12. The differences between FIGS. 8 to 12 can also be seen from the configuration of the structures in the pre-chamber levels.

Figure 8:
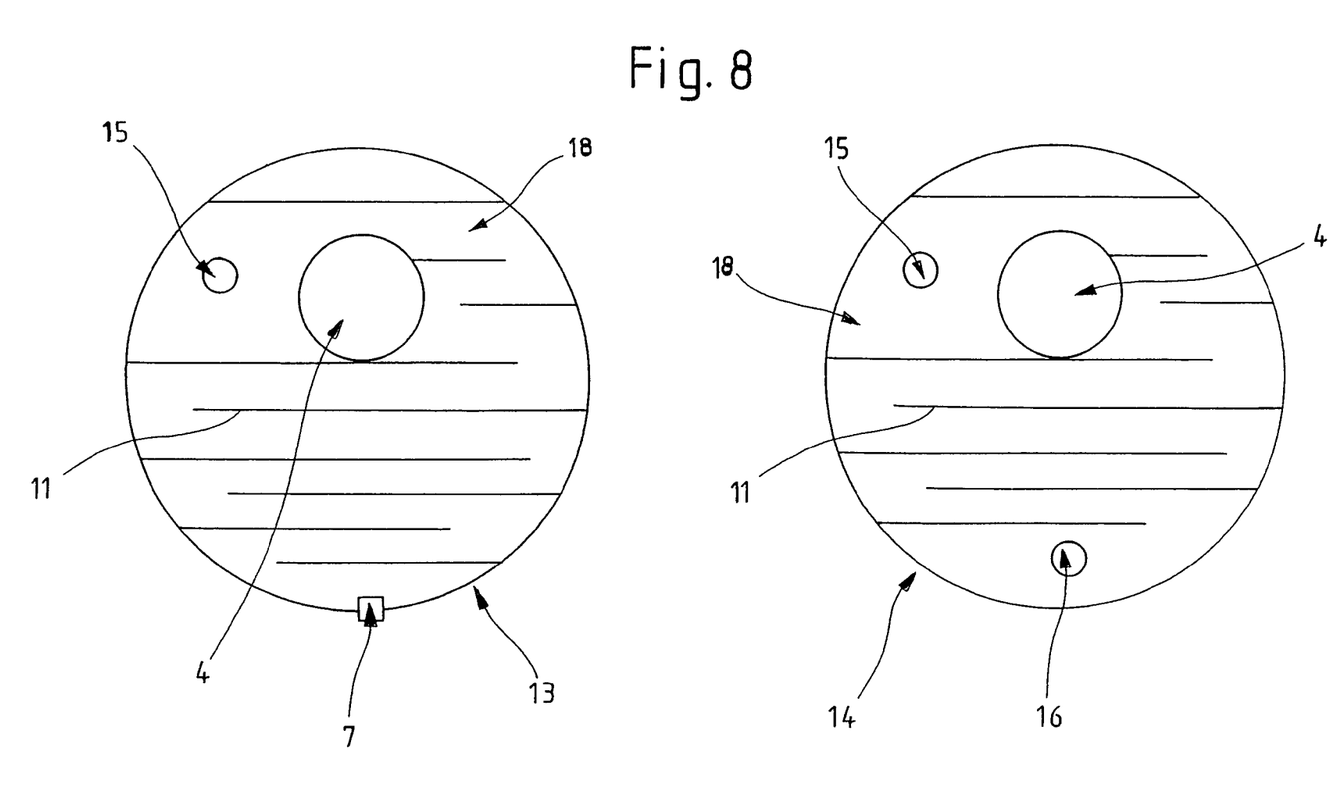
FIG. 8 shows an illustration of the levels of an embodiment of a pre-chamber with two levels and deflection elements, arranged in the levels, in top view.

FIG. 8 shows deflection elements 11 aligned parallel to each other, which project from the pre-chamber wall into the interior of pre-chamber 6 and form a duct 18, which is constructed as a meander in the respective level, with both levels 13, 14, as in FIG. 6 and FIG. 7, being flowed through in opposite directions with respect to each other.

Figure 9:
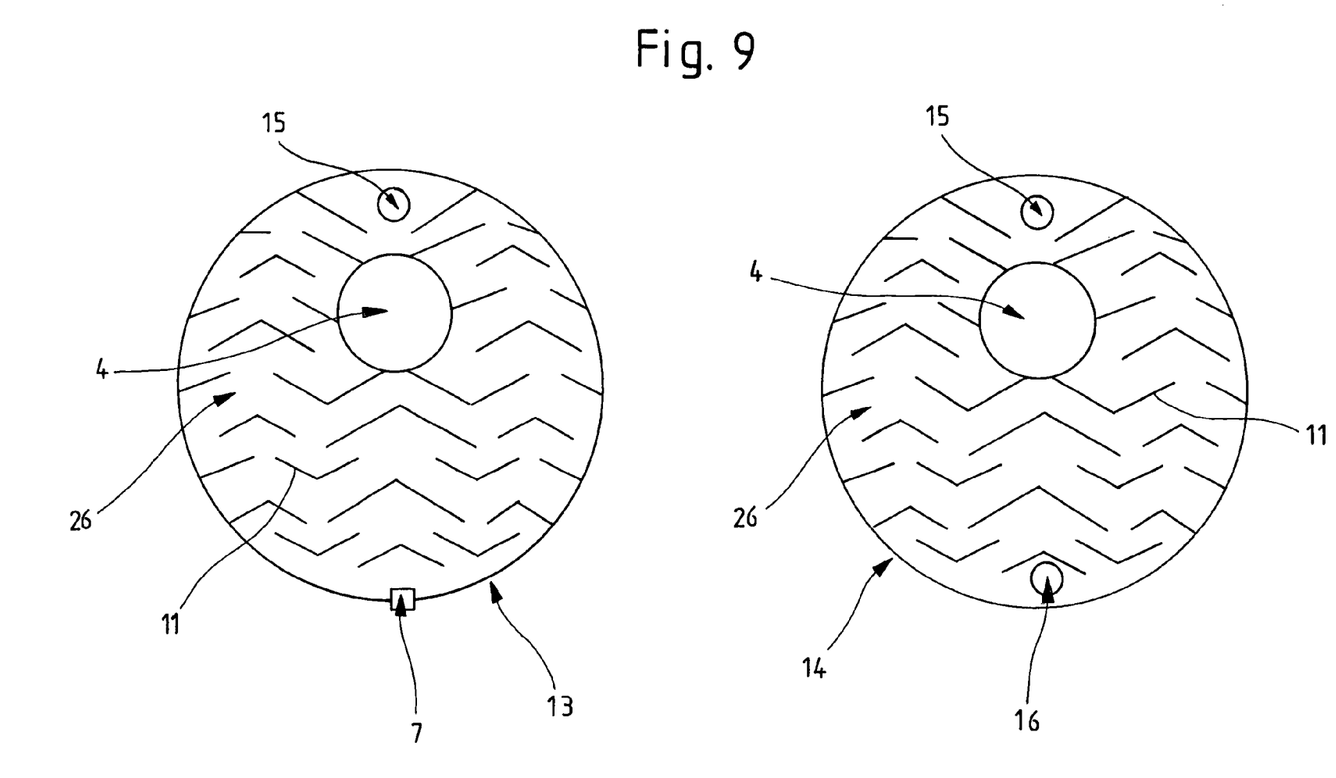
FIG. 9 shows an illustration of the levels of a second embodiment of a pre-chamber with two levels and deflection elements arranged in the levels, in top view.

In the pre-chamber structure in FIG. 9, deflection elements 11 are formed as barriers which distribute the inflowing fluid over the entire surface 26 of upper level 13 and of lower level 14. In this embodiment, the individual deflection elements 11 are respectively constructed in a V-shape and are arranged in levels 13, 14 such that the openings between individual deflection elements 11, shaped as barriers, are arranged staggered with respect to each other.

Figure 10:
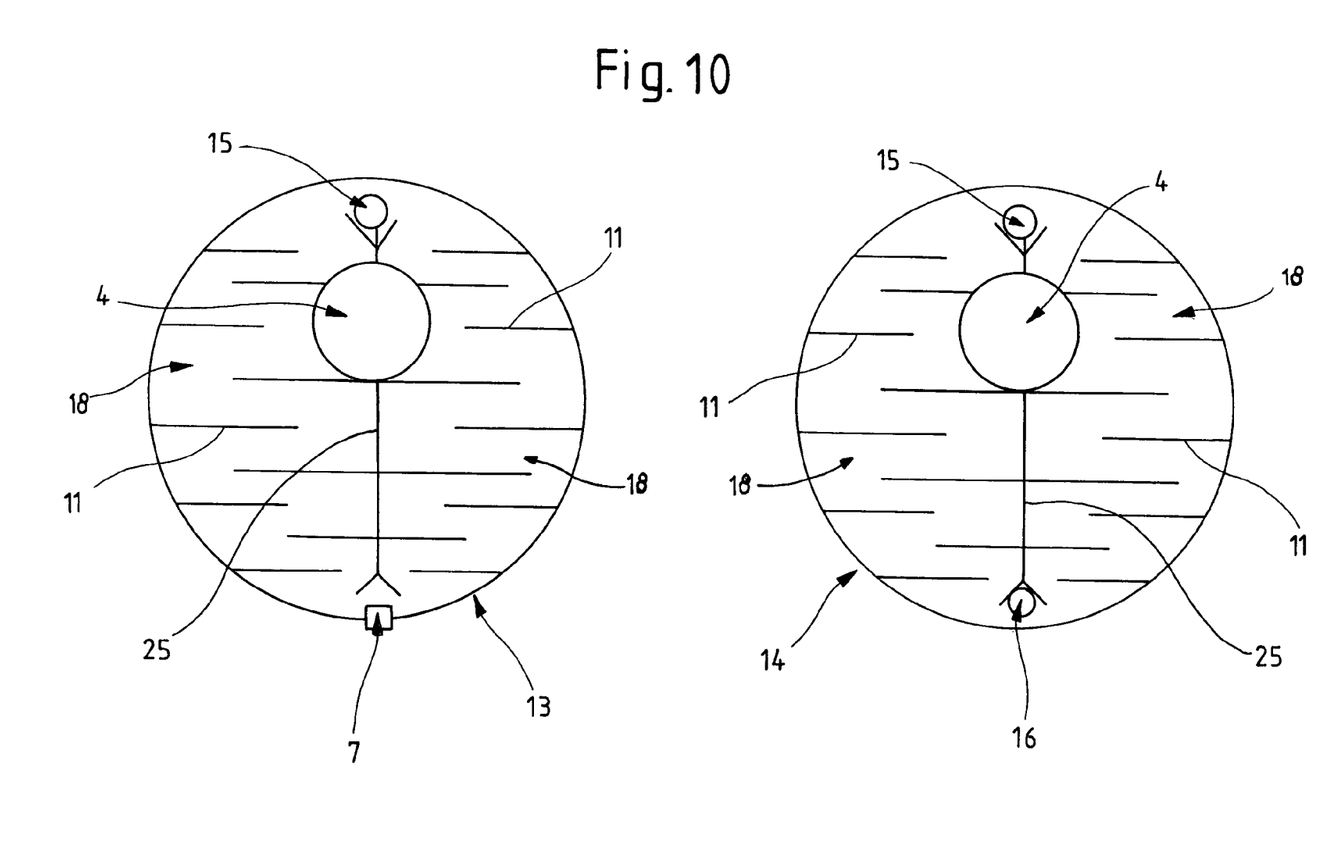
FIG. 10 shows an illustration of the levels of a third embodiment of a pre-chamber with two levels and deflection elements arranged in the levels, in top view.

Parallel deflection elements 11, similar to those in FIG. 8, are again arranged in levels 13, 14 of the embodiment in FIG. 10, wherein here in each of the two levels 13, 14 two separate ducts 18 are formed, which are respectively divided or guided together at the openings in the respective levels. These openings are inlet opening 7 and connecting opening 15 in upper level 13, and connecting opening 15 and outlet opening 16 in lower level 14. In order to separate the ducts in the respective level, in addition to deflection elements 11, a further element 25 is provided, from which in turn deflection elements 11 extend. By the additional deflection elements 11, which extend from element 25, a meander structure is created respectively in ducts 18.

Figure 11:
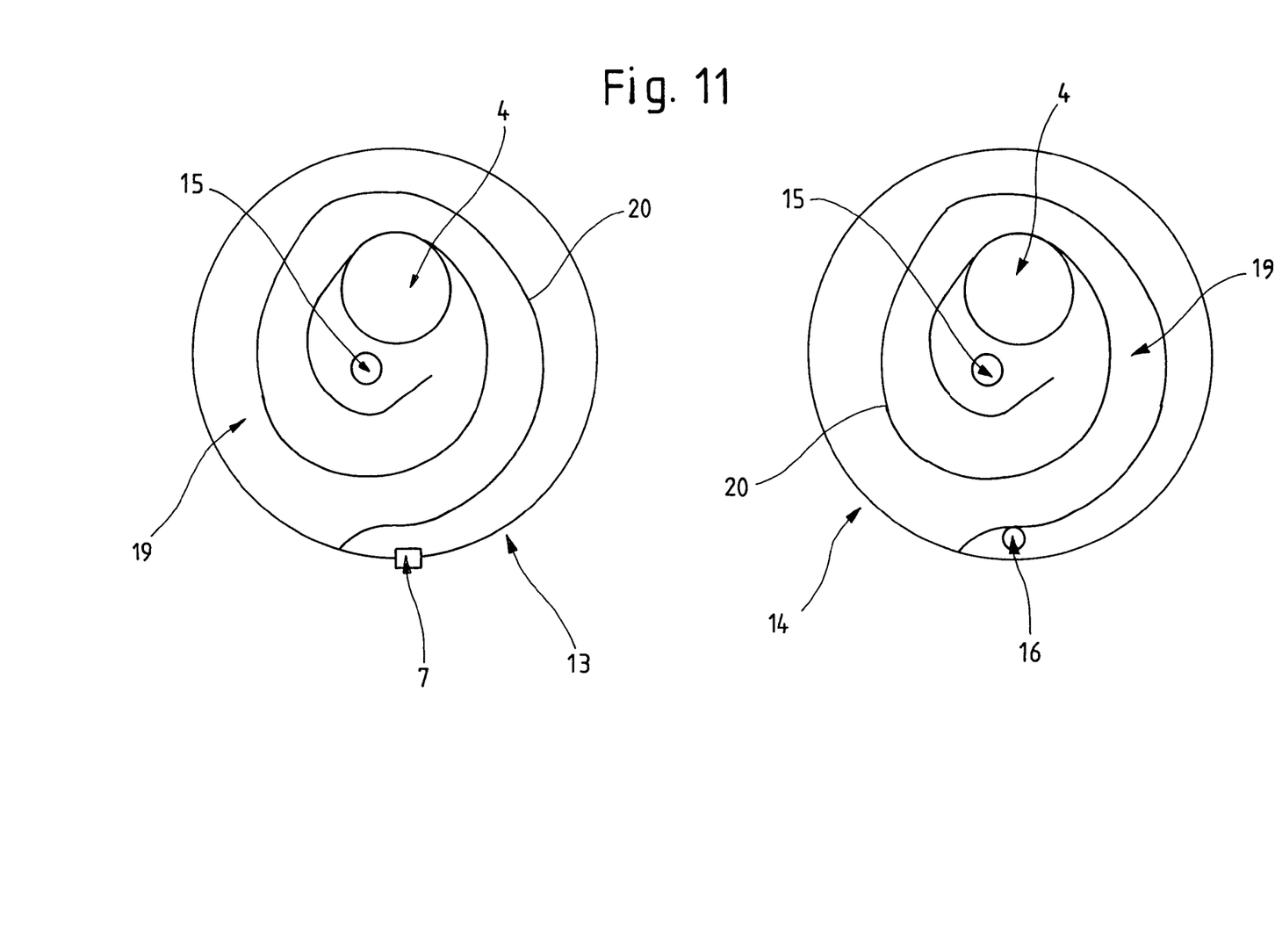
FIG. 11 shows an illustration of the levels of a fourth embodiment of a pre-chamber with two levels and spiral structures arranged in the levels, in top view.

A spiral structure as in FIG. 3 is shown in FIG. 11 for a pre-chamber 6 with two levels. In this embodiment, inflowing fluid is guided in upper level 13 from the exterior into the interior of the spiral structure formed by a lead element 20, and is guided in lower level 14 by the spiral structure oppositely directed to the upper level.

Figure 12:
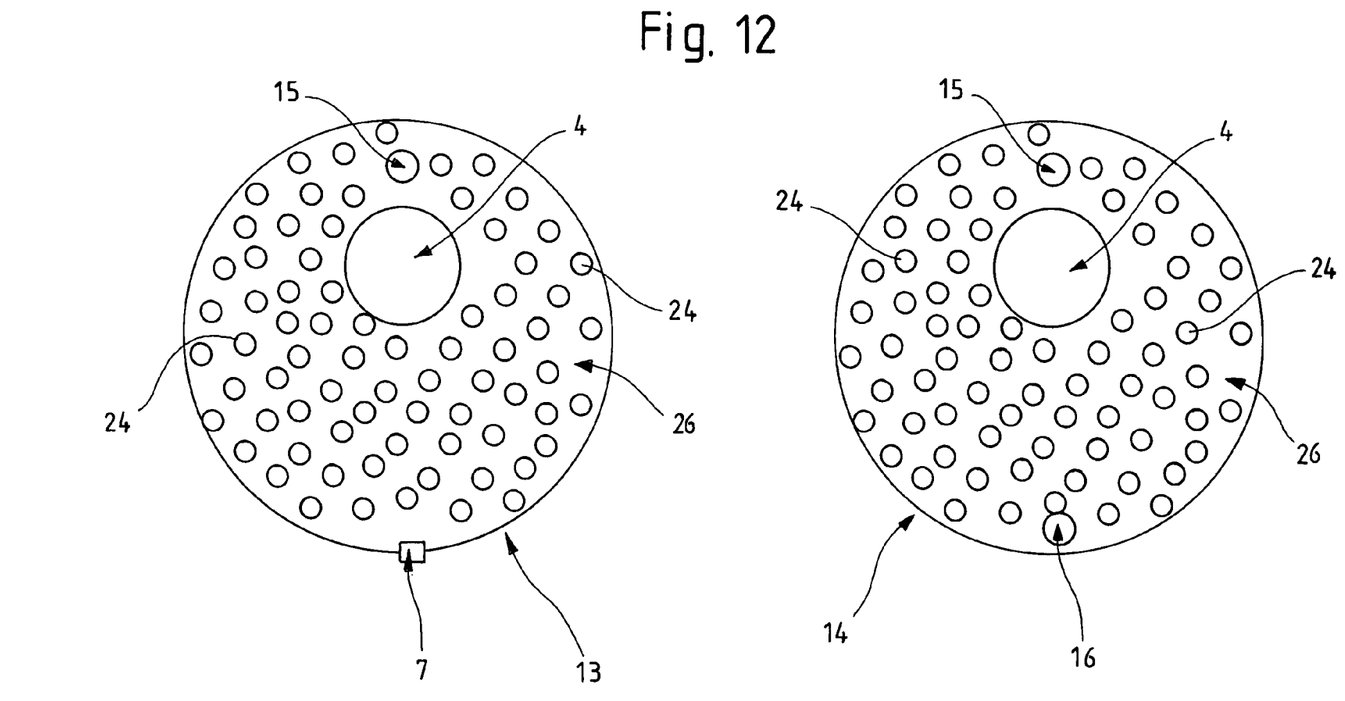
FIG. 12 shows an illustration of the levels of a fifth embodiment of a pre-chamber with two levels and a plurality of domes arranged in the levels, in top view.

No lead element 20 or deflection element 11 is provided in the embodiment in FIG. 12. The deceleration and the distribution of inflowing fluid over free surface 26 is influenced by a plurality of domes 24 arranged in the levels 13, 14, around which the inflowing fluid must flow.

Accordingly, while only a few embodiments have been shown and described, it is obvious that many changes and modifications may be made thereunto without departing from the spirit and scope of the invention.

The invention claimed is:

1. A device for determining a filling level in a container, comprising:
   a stillwell which has an entry opening and a vent opening;
   an ultrasonic transducer arranged in the stillwell;
      wherein the ultrasonic transducer has a measurement section in the stillwell; and
      at least one pre-chamber comprising:
         i) an inlet opening to the container,
         ii) an outlet opening to the entry opening of the stillwell,
         iii) a second outlet opening;
   a lead off arrangement positioned stacked above said pre-chamber wherein said second outlet opening is a bypass that opens out in said lead-off arrangement, wherein said bypass is arranged parallel to the measurement section of the ultrasonic transducer, wherein said bypass is configured to prevent foam from reaching the measurement section, wherein said lead-off arrangement ends in an upper end region of the measurement section of the stillwell.

2. The device according to claim 1, wherein the second outlet opening of the pre-chamber is arranged in a flow direction directly behind the inlet opening of the pre-chamber to the container and before windings of the pre-chamber.

3. The device according to claim 1, wherein the outlet opening with the lead-off arrangement is arranged in an upper region of the pre-chamber.

4. The device according to claim 1, wherein the lead-off arrangement is arranged parallel to the measurement section.

5. The device according to claim 1, wherein the lead-off arrangement is guided lying externally against the stillwell.

6. The device according to claim 1, further comprising a shielding element associated with the lead-off arrangement in the upper end region.

7. The device according to claim 6, wherein the shielding element spans the lead-off arrangement and the measurement section of the stillwell.

8. The device according to claim 1, wherein the pre-chamber has at least two levels lying horizontally one over another and wherein the levels are flowed through in opposite directions with respect to each other.

9. The device as in claim 1, wherein the measurement section extends along the stillwell.

10. The device as in claim 1, wherein the lead off arrangement has an opening to the container such that the bypass leads to the container to prevent foam from reaching the measurement section.

11. An engine, having a device for determining a filling level in a container, comprising:
   a stillwell which has an entry opening and a vent opening;
   an ultrasonic transducer arranged in the stillwell; and
   wherein the ultrasonic transducer has a measurement section in the stillwell;
   at least one pre-chamber,
   wherein the pre-chamber comprises:
      i) an an inlet opening to the container,
      ii) an outlet opening to the entry opening of the stillwell,
      iii) a second outlet opening;
   a lead-off arrangement, wherein said second outlet opening is a bypass that opens out in said lead-off arrangement, wherein said bypass is arranged parallel to the measurement section of the ultrasonic transducer, wherein said bypass is configured to prevent foam from reaching the measurement section, wherein said lead-off arrangement ends in an upper end region of the measurement section of the stillwell.

12. The device as in claim 11, wherein the measurement section extends along the stillwell and wherein said bypass extends vertically.

13. The engine as in claim 11, wherein the lead off arrangement has an opening to the container such that the bypass leads exclusively to the container to prevent foam from reaching the measurement section.

14. The engine as in claim 11, wherein said lead off arrangement positioned stacked above said pre-chamber.

15. A motor vehicle, having a device for determining a filling level in a container, comprising:
   a stillwell which has an entry opening and a vent opening;
   an ultrasonic transducer arranged in the stillwell;
   wherein the ultrasonic transducer has a measurement section in the stillwell;
   at least one pre-chamber,
   wherein the pre-chamber comprises:
      i) an inlet opening to the container,
      ii) an outlet opening to the entry opening of the stillwell,
      iii) a second outlet opening;
   a lead-off arrangement wherein said second outlet opening is a bypass that opens out in said lead-off arrangement, wherein said bypass is arranged parallel to the measurement section of the ultrasonic transducer, wherein said bypass is configured to prevent foam from reaching the measurement section, wherein said lead-off arrangement ends in an upper end region of the measurement section of the stillwell and has an opening to the outer container to lead said foam back to said container.

16. The device as in claim 15, wherein the measurement section extends along the stillwell.

17. The engine as in claim 15, wherein the bypass leads exclusively to the container to prevent foam from reaching the measurement section.

18. The motor vehicle as in claim 15, wherein said lead off arrangement positioned stacked above said pre-chamber.

* * * * *